United States Patent
Seo et al.

(10) Patent No.: US 10,511,947 B2
(45) Date of Patent: Dec. 17, 2019

(54) REMOTE CONTROL, ELECTRONIC APPARATUS AND PAIRING METHOD THEREOF

(71) Applicant: SAMSUNG ELECTRONICS CO., LTD., Suwon-si, Gyeonggi-do (KR)

(72) Inventors: Je-hwan Seo, Daegu (KR); Chae-young Lim, Bucheon-si (KR); Young-hoon Moon, Seoul (KR); Jong-ha Woo, Suwon-si (KR); Kyung-ik Cho, Suwon-si (KR); Min-sup Kim, Suwon-si (KR); Min-ji Kim, Yongin-si (KR); Jin Seol, Seongnam-si (KR); Ki-hyun Song, Suwon-si (KR); Suk-hoon Yoon, Yongin-si (KR); Hyun-kyu Yun, Seoul (KR); Jong-keun Lee, Seoul (KR); Woong-no Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/998,996

(22) Filed: Aug. 20, 2018

(65) Prior Publication Data

US 2019/0166477 A1    May 30, 2019

(30) Foreign Application Priority Data

Nov. 28, 2017 (KR) .................. 10-2017-0159839

(51) Int. Cl.
  *H04N 21/422*   (2011.01)
  *H04W 4/80*    (2018.01)
  (Continued)

(52) U.S. Cl.
  CPC .............. *H04W 4/80* (2018.02); *G08C 17/02* (2013.01); *H04B 17/318* (2015.01);
  (Continued)

(58) Field of Classification Search
  CPC .............................. H04W 4/80; H04W 17/318
  See application file for complete search history.

(56) References Cited

U.S. PATENT DOCUMENTS

| | | | |
|---|---|---|---|
| 2008/0165024 A1* | 7/2008 | Gretton | G01C 21/3655 340/4.31 |
| 2010/0130131 A1 | 5/2010 | Ha et al. | |
| 2010/0255787 A1 | 10/2010 | Wilson et al. | |

(Continued)

FOREIGN PATENT DOCUMENTS

| | | |
|---|---|---|
| JP | 4750061 | 8/2011 |
| KR | 10-2014-0049365 | 4/2014 |

(Continued)

OTHER PUBLICATIONS

Search Report mailed and Written Opinion dated Nov. 28, 2018 in counterpart International Patent Application No. PCT/KR2018/009677.

(Continued)

*Primary Examiner* — Tuan H Nguyen
(74) *Attorney, Agent, or Firm* — Nixon & Vanderhye P.C.

(57) ABSTRACT

A remote control apparatus is provided. The remote control apparatus according to an embodiment includes a microphone, a communicator comprising communication circuitry configured to transmit a first advertising packet, and to receive a second advertising packet including respective addresses of a plurality of electronic apparatuses from the plurality of electronic apparatuses in response to transmission of the first advertising packet, and a processor configured to, based on the second advertising packet being received, determine a priority based on reception characteristic of the second advertising packet, and transmit a third advertising packet including a sound output request and an address of an electronic apparatus determined based on the priority from among the received addresses of the plurality of electronic apparatuses through the communicator, and based on sound output from an electronic apparatus being received through the microphone in response to transmission of the third advertising packet, to control the communicator to perform a pairing with the electronic apparatus which outputs the sound.

12 Claims, 12 Drawing Sheets

(51) Int. Cl.
*H04W 76/14* (2018.01)
*H04W 8/22* (2009.01)
*H04B 17/318* (2015.01)
*G08C 17/02* (2006.01)

(52) U.S. Cl.
CPC ........ *H04N 21/42222* (2013.01); *H04W 8/22* (2013.01); *H04W 76/14* (2018.02); *G08C 2201/20* (2013.01)

(56) References Cited

U.S. PATENT DOCUMENTS

| | | |
|---|---|---|
| 2010/0278345 A1* | 11/2010 | Alsina ................ H04L 63/0492 380/283 |
| 2011/0319017 A1 | 12/2011 | Lee et al. |
| 2014/0104990 A1 | 4/2014 | Shim |
| 2014/0179234 A1 | 6/2014 | Lee et al. |
| 2015/0065049 A1 | 3/2015 | Heo et al. |
| 2015/0093990 A1 | 4/2015 | Lin |
| 2015/0220296 A1 | 8/2015 | Lin et al. |
| 2016/0150066 A1 | 5/2016 | Yae |
| 2016/0162586 A1 | 6/2016 | Maxwell |

FOREIGN PATENT DOCUMENTS

| | | |
|---|---|---|
| KR | 10-1544431 | 8/2015 |
| KR | 10-1568335 | 11/2015 |
| KR | 10-1657314 | 9/2016 |

OTHER PUBLICATIONS

Extended Search Report dated Feb. 11, 2019 in counterpart European Patent Application No. 18190811.2.

* cited by examiner

FIG. 1A
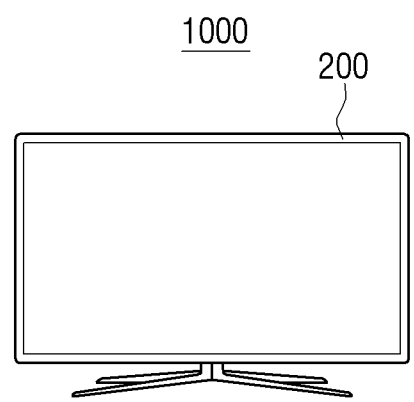
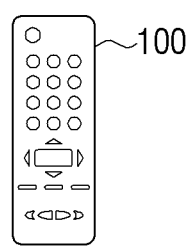

REMOTE CONTROL, ELECTRONIC APPARATUS AND PAIRING METHOD THEREOF

CROSS-REFERENCE TO RELATED APPLICATION

This application is based on and claims priority under 35 U.S.C. § 119 to Korean Patent Application No. 10-2017-0159839, filed on Nov. 28, 2017, in the Korean Intellectual Property Office, the disclosure of which is incorporated by reference herein in its entirety.

BACKGROUND

1. Field

The present disclosure relates generally to a remote control, an electronic apparatus and a pairing method thereof, and for example, to a remote control apparatus for performing a pairing according to a Bluetooth communication method, an electronic apparatus, and a pairing method thereof.

2. Description of Related Art

With the recent development of electronic technology, various devices are controlled by a remote controller.

A device may be connected to a remote controller using a communication method such as a Wi-Fi communication method, a Bluetooth communication method, etc.

A method for connecting a device to a remote controller includes a method in which a device outputs sound through a speaker, and a remote controller is connected to the device as set in advance upon receiving of the sound output from the device, and a method of transmitting and receiving data between devices through Orthogonal Frequency Division Multiplexing (OFDM) and performing connection between the devices therethrough.

However, according to the method of connecting a device to a remote controller as set in advance upon receiving of the sound output from the device, when a plurality of devices simultaneously output sound, communication errors could occur due to interference and collision, and when a remote controller receives responses from the plurality of devices, it is difficult to distinguish which response is valid data, that is, which device should be paired with.

According to a method of using the OFDM, there is a problem that it is not desirable in terms of cost since a CPU having excellent performance is required.

Accordingly, a method for more effectively connecting a device to a remote controller has been in demand.

SUMMARY

An aspect of the example embodiments relates to a remote control apparatus for specifying a device to perform a pairing based on a priority and performing a pairing accordingly, an electronic apparatus and a pairing method thereof.

According to an example embodiment, a remote control apparatus is provided, the remote control apparatus including a microphone, a communicator comprising communication circuitry configured to transmit a first advertising packet, and to receive a second advertising packet including respective addresses of a plurality of electronic apparatuses from the plurality of electronic apparatuses in response to transmission of the first advertising packet, and a processor configured to, determine a priority based on reception characteristic of the second advertising packet based on the second advertising packet being received, and transmit a third advertising packet including a sound output request and an address of an electronic apparatus determined based on the priority from among the received addresses of the plurality of electronic apparatuses through the communicator, and to control the communicator to perform a pairing with the electronic apparatus which outputs the sound based on sound output from an electronic apparatus being received through the microphone in response to transmission of the third advertising packet.

The reception characteristic of the packet may include a received signal strength indicator (RSSI) of the packet.

The processor may be further configured to determine the priority where an address of an electronic apparatus transmitted through a packet having a relatively large RSSI has a relatively high priority.

The processor may be further configured to transmit a third advertising packet including a sound output request and an address of an electronic apparatus having a next highest priority following an address of the electronic apparatus to which the third advertising packet is transmitted based on the priority through the communicator, based on the sound not being received after the third advertising packet is transmitted.

The processor may be further configured to transmit a fourth advertising packet including a pairing request and an address of the electronic apparatus which outputs the sound to the electronic apparatus which outputs the sound, and to control the communicator to perform a pairing with the electronic apparatus which outputs the sound in response to transmission of the fourth advertising packet.

An address of the electronic apparatus may be a Bluetooth MAC address of the electronic apparatus.

The sound may be sound in a non-audible frequency band.

According to an example embodiment, an electronic apparatus is provided, the electronic apparatus including a speaker, a communicator comprising communication circuitry configured to transmit a second advertising packet including an address of the electronic apparatus based on a first advertising packet being received from a remote control apparatus, and a processor configured to, based on a third advertising packet including a sound output request and the address of the electronic apparatus being received from the remote control apparatus through the communicator in response to transmission of the second advertising packet, output sound through the speaker in response to reception of the third advertising packet, and based on a fourth advertising packet including a pairing request being received from the remote control apparatus through the communicator in response to output of the sound, and to control the communicator to perform a pairing with the remote control apparatus.

The address of the electronic apparatus may be a Bluetooth MAC address of the electronic apparatus.

The sound may be sound in a non-audible frequency band.

According to an example embodiment, a pairing method of a remote control apparatus is provided, the method including transmitting a first advertising packet, receiving a second advertising packet including respective addresses of a plurality of electronic apparatuses from the plurality of electronic apparatuses in response to transmission of the first advertising packet, and based on the second advertising packet being received, determining a priority based on reception characteristic of the second advertising packet, transmitting a third advertising packet including a sound output request and an address of an electronic apparatus determined based on the priority from among the received addresses of the plurality of electronic apparatuses, and based on sound output from an electronic apparatus being received in response to transmission of the third advertising packet, performing a pairing with the electronic apparatus which outputs the sound.

The reception characteristic of the packet may include a received signal strength indicator (RSSI) of the packet.

The determining may include determining the priority where an address of an electronic apparatus transmitted through a packet having a relatively large RSSI has a relatively high priority.

The transmitting of the third advertising packet may include, based on the sound not being received after the third advertising packet is transmitted, transmitting a third advertising packet including a sound output request and an address of an electronic apparatus having a next highest priority following an address of the electronic apparatus to which the third advertising packet is transmitted based on the priority.

The pairing may include, transmitting a fourth advertising packet including a pairing request and an address of the electronic apparatus which outputs the sound to the electronic apparatus which outputs the sound, and performing a pairing with the electronic apparatus which outputs the sound in response to transmission of the fourth advertising packet.

An address of the electronic apparatus may be a Bluetooth MAC address of the electronic apparatus.

The sound may be sound in a non-audible frequency band.

According to an example embodiment, a pairing method of an electronic apparatus is provided, the method including based on a first advertising packet being received from a remote control apparatus, transmitting a second advertising packet including an address of the electronic apparatus, based on a third advertising packet including an address of the electronic apparatus and a sound output request being received from the remote control apparatus in response to transmission of the second advertising packet, outputting sound through the speaker in response to reception of the third advertising packet, and based on a fourth advertising packet including a pairing request being received from the remote control apparatus in response to output of the sound, performing a pairing with the remote control apparatus.

The address of the electronic apparatus may be a Bluetooth MAC address of the electronic apparatus.

The sound may be sound in a non-audible frequency band.

According to the above-described various example embodiments, communication errors due to interference and collision that could occur as a plurality of electronic apparatuses simultaneously output sound could be prevented and/or reduced in that an electronic apparatus outputs sound based on an address of an electronic apparatus included in an advertising packet, reliability with regard to pairing could be ensured and/or improved even in the presence of a plurality of electronic devices in that a device for performing a pairing could be specified based on a priority. In addition, cost reduction could be available in that a pairing could be performed with a specified device without using an additional communication such as OFDM.

BRIEF DESCRIPTION OF THE DRAWINGS

The above and other aspect, features and attendant advantages of various example embodiment of the present disclosure will be more apparent and readily appreciated from the following detailed description, taken in conjunction with the accompanying drawings, in which like reference numerals refer to like element, and wherein:

FIGS. 1A and 1B are diagrams illustrating a system according to an example embodiment of the present disclosure;

DETAILED DESCRIPTION

The disclosure is not limited to the various example embodiments disclosed below and may be implemented in various forms and the scope of the disclosure is not limited to the following example embodiments. In addition, all changes or modifications derived from the meaning and scope of the claims and their equivalents should be understood as being included within the scope of the present disclosure. In the following description, various configurations which are publicly known but not relevant to the gist of the present disclosure may be omitted.

The terms such as "first," "second," and so on may be used to describe a variety of elements, but the elements should not be limited by these terms. The terms are used simply to distinguish one element from other elements.

The singular expression also includes the plural meaning so long as it does not conflict with the context. In this disclosure, terms such as 'include' and 'have/has' should be understood as designating that there are such characteristics, numbers, operations, elements, components or a combination thereof in the disclosure, not to exclude the existence or possibility of adding one or more of other characteristics, numbers, operations, elements, components or a combination thereof.

In an example embodiment, 'a module', 'a unit', and/or 'a part' may perform at least one function or operation, and may be realized as hardware, such as a processor or integrated circuit, software that is executed by a processor, or any combination thereof. In addition, a plurality of 'modules', a plurality of 'units', and/or a plurality of 'parts' may be integrated into at least one module or chip and may be realized as at least one processor except for 'modules', 'units' or 'parts' that should be realized in a specific hardware.

Figure 1B:
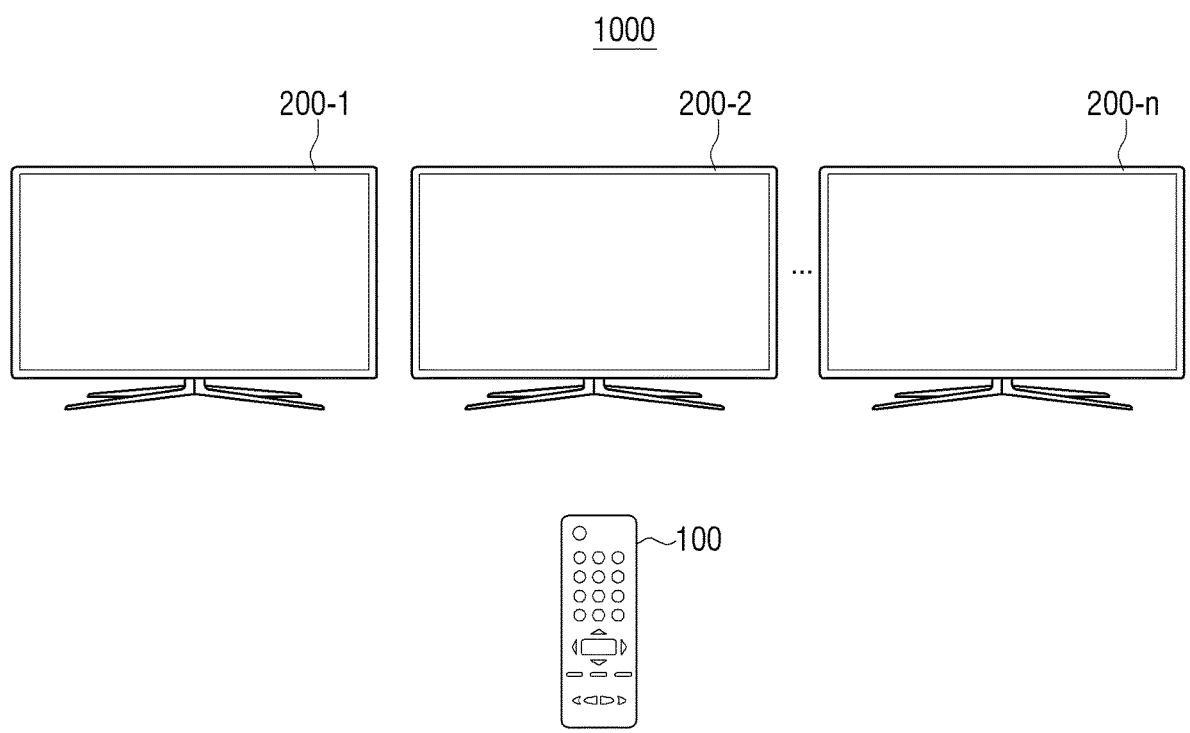

Hereinafter, various example embodiments of the present disclosure will be described in greater detail with reference to the accompanying drawings FIGS. 1A and 1B are diagrams illustrating an example system according to an example embodiment of the present disclosure.

Referring to FIG. 1A, a system 1000 may include a remote control apparatus 100 and an electronic apparatus 200.

As illustrated in FIG. 1A, the electronic apparatus 200 may be embodied, for example, and without limitation, as a TV, and the remote control apparatus 100 may be embodied, for example, and without limitation, as a remote controller for controlling the electronic apparatus 200 or a smartphone where an application for controlling the electronic apparatus 200 is installed. However, the present disclosure is not limited thereto, but the remote control apparatus 100 and the electronic apparatus 200 can be embodied as various types of apparatuses.

The remote control apparatus 100 may perform a pairing with the electronic apparatus 200.

The pairing may refer, for example, to a procedure for confirming a password, identification information, authentication information, or the like for intercommunication connection between devices that support, for example, and without limitation, a Bluetooth function, or the like.

The remote control apparatus 100 may, for example, and without limitation, be connected to the electronic apparatus 200 through pairing using a Bluetooth communication method. The remote control apparatus 100 may establish a communication link and perform communication with the electronic apparatus 200 according to a Bluetooth communication method when Bluetooth pairing is used.

The Bluetooth communication method may include Bluetooth Low Energy (BLE).

According to an example embodiment of the present disclosure, an address of the electronic apparatus 200 and sound output from the electronic apparatus 200 may be used to specify a device which performs a pairing.

The sound may refer, for example, to sound in a non-audible frequency band. The sound in the non-audible frequency band may include, for example, and without limitation, sound in a frequency band (e.g., ultrasound above 20 kHz) other than an audible frequency band that people can hear (e.g., 20 Hz to 20 kHz).

For example, the remote control apparatus 100 may transmit a packet including an address of the electronic apparatus 200 and a sound output request, and the electronic apparatus 200 may output sound in a non-audible frequency band (e.g., non-audible sound) when the packet transmitted from the remote control apparatus 200 is received.

When the non-audible sound is received, the remote control apparatus 100 may again transmit a packet including a pairing request and the address of the electronic apparatus 200 which is transmitted by itself before the non-audible sound is received.

When the packet transmitted from the remote control apparatus 100 is received, the electronic apparatus 200 may perform a pairing with the remote control apparatus 100 based on the address and the pairing request included in the packet, and be connected to the remote control apparatus 100 using a Bluetooth communication method.

When performing a pairing as described above, a device for performing a pairing is simply specified.

Referring to FIG. 1B, the remote control apparatus 100 may perform a pairing with the specified electronic apparatus through the above-described process although a plurality of electronic apparatuses 200-1, 200-2, . . . , and 200-n are provided at a periphery of the remote control apparatus 100.

Figure 2:
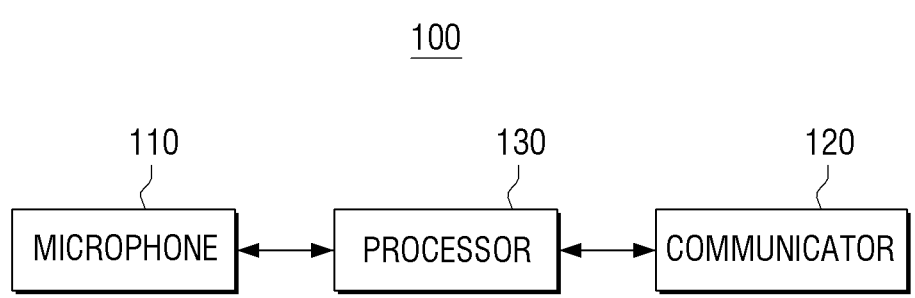
FIG. 2 is a block diagram illustrating an example configuration of a remote control apparatus according to an example embodiment of the present disclosure.

FIG. 2 is a block diagram illustrating an example configuration of a remote control apparatus according to an example embodiment of the present disclosure.

Referring to FIG. 2, a remote control apparatus 100 may include, for example, and without limitation, a microphone 110, a communicator (e.g., including communication circuitry) 120 and a processor (e.g., including processing circuitry) 130.

The microphone 110 may include various circuitry and receive sound. The microphone 110 may receive non-audible sound (e.g., sound in a non-audible frequency band).

The sound in the non-audible frequency band may, for example, and without limitation, include sound in a frequency band (e.g., ultrasound above 20 kHz) other than an audible frequency band that people can actually hear (e.g., 20 Hz to 20 kHz)

The communicator 120 may include various communication circuitry and perform communication with the electronic apparatus 200. For example, the communicator 120 may perform communication with the electronic apparatus 200 using a Bluetooth communication method. The Bluetooth communication method may include Bluetooth Low Energy (BLE).

For example, the communicator 120 may perform a pairing with the electronic apparatus 200 using the Bluetooth communication method, form a communication link with the electronic apparatus 200, and perform communication with the electronic apparatus 200 through a communication link.

The communicator 120 may, for example, and without limitation, include a Bluetooth communication chip for performing communication using the Bluetooth communication method.

The processor 130 may include various processing circuitry and control overall operation of the remote control apparatus 100.

The processor 130 may perform an operation for specifying the other device to perform a pairing before paring.

A method for specifying the other device for performing a pairing of the remote control apparatus 100 will be described on the assumption that a plurality of electronic apparatuses 200-1, 200-2, . . . and 200-n are provided at a periphery of the remote control apparatus 100.

The processor 130 may transmit a first advertising packet (Undirected Advertising Packet) through the communicator 120.

The plurality of electronic apparatuses 200-1, 200-2, . . . , and 200-n at a periphery of the remote control apparatus 100 may receive a first advertising packet transmitted from the remote control apparatus 100. Each of the plurality of electronic apparatuses 200-1, 200-2, . . . , and 200-n may transmit a second advertising packet including its own address when the first advertising packet is received.

The address may be a Bluetooth MAC address of the electronic apparatus.

The communicator 120 may receive a second advertising packet including respective addresses of the plurality of electronic apparatuses 200-1, 200-2, . . . , and 200-n from the plurality of electronic apparatuses in response to the transmission of the first advertising packet.

When the second advertising packet is received, the processor 130 may determine a priority based on the reception characteristic of the packet.

The reception characteristic of the packet may include a received signal strength indicator (RSSI) of the received packet.

The processor 130 may determine a priority of the electronic apparatuses so that an address of an electronic apparatus transmitted through a packet having a relatively large RSSI may have a relatively high priority.

For example, it is assumed that when a first electronic apparatus transmits a first packet including an address of the first electronic apparatus, the RSSI with respect to the first packet received through the communicator 120 may be −40 dBm, when a second electronic apparatus transmits a second packet including an address of the second electronic apparatus, the RSSI with respect to the second packet received through the communicator 120 may be −70 dBm, and when a third electronic apparatus transmits a third packet including an address of the third electronic apparatus, the RSSI with respect to the third packet received through the communicator 120 may be −60 dBm.

The processor 130 may determine a priority of the address of the first electronic apparatus included in the first packet having a greatest RSSI value as being the highest, a priority of the address of the third electronic apparatus included in the third packet having a second greatest RSSI value as being the second highest following the priority of the address of the first electronic apparatus, and a priority of the address of the second electronic apparatus included in the second packet having a third greatest RSSI value as being the third highest following the priority of the address of the third electronic apparatus.

In other words, the processor 130 may determine priorities in the order of the address of the first electronic apparatus, the address of the third electronic apparatus and the address of the second electronic apparatus.

The processor 130 may transmit a third advertising packet including a sound output request and an address of an electronic apparatus determined based on a priority from among addresses of the received plurality of electronic apparatuses, through the communicator 120.

The processor 130 may determine an address of an electronic apparatus having the highest priority among the determined priorities, and transmit the third advertising packet including the determined address and the sound output request through the communicator 120.

The processor 130 may control the communicator 120 to perform a pairing with an electronic apparatus which outputs sound when the sound output from the electronic apparatus is received through the microphone 110 in response to the transmission of the third advertising packet.

The sound may refer, for example, and without limitation, to sound in a non-audible frequency band (e.g., non-audible sound). The sound in the non-audible frequency band may include sound in a frequency band (e.g., ultra sound above 20 kHz) other than the audible frequency band that people can actually hear (e.g., 20 Hz to 20 kHz).

The remote control apparatus 100 may transmit an address of an electronic apparatus having the highest priority through the third advertising packet.

The plurality of electronic apparatuses 200-1, 200-2, . . . , and 200-n provided at a periphery of the remote control apparatus 100 may receive the third advertising packet transmitted from the remote control apparatus 100.

Each of the plurality of electronic apparatuses 200-1, 200-2, . . . , and 200-n may determine whether an address included in the third advertising packet is the same as its own address, and output non-audible sound according to a sound output request included in the third advertising packet even when the address included in the third advertising packet is the same as its own address.

According the above-described example, given that the RSSI value of the first packet transmitted from the first electronic apparatus is the greatest, the processor 130 may transmit the third advertising packet including the address of the first electronic apparatus and the sound output request through the communicator 120.

The first to third electronic apparatuses may receive the third advertising packet transmitted from the remote control apparatus 100.

Given that the third advertising packet includes the address of the first electronic apparatus, in this example, only the first electronic apparatus may output non-audible sound according to a sound output request included in the third advertising packet, and the remote control apparatus 100 may receive non-audible sound output from the first electronic apparatus.

When the sound output from the electronic apparatus is received through the microphone 110, the processor 130 may control the communicator 120 to perform a pairing with the electronic apparatus which outputs the sound.

The processor 130 may control the communicator 120 to transmit a fourth advertising packet including the address of the electronic apparatus which outputs sound and a pairing request to the electronic apparatus which outputs sound, and to perform a pairing with the electronic apparatus which outputs sound in response to the transmission of the fourth advertising packet.

When sound is received after the third advertising packet is transmitted, the processor 130 may determine that an address of the electronic apparatus transmitted through the third advertising packet before receiving the sound as an address of the electronic apparatus which outputs the sound, and transmit the fourth advertising packet including the pairing request and the determined address.

The electronic apparatus which outputs sound may receive the fourth advertising packet, determine whether the address included in the fourth advertising packet is the same as its own address, and if the address included in the fourth advertising packet is the same as its own address, perform a pairing with the remote control apparatus 100 according to a pairing request included in the fourth advertising packet using the Bluetooth communication method.

The remote control apparatus 100 may be connected to the electronic apparatus which outputs sound according to the Bluetooth communication method.

The processor 130 may control the communicator 120 to wait to receive sound for a predetermined period of time after the third advertising packet is transmitted.

The processor 130 may perform a pairing with an electronic apparatus which outputs sound as described above when sound is received in a predetermined time after the third advertising packet is transmitted.

However, when sound is not received within a predetermined period of time after an advertising packet is transmitted, the processor 130 may transmit a third advertising packet including a sound output request and an address of an electronic apparatus having the next highest priority following the already-transmitted address of the electronic apparatus based on the priority, through the communicator 120.

Given that an RSSI value of the third packet is the next largest following an RSSI value of the first packet, the address of the third electronic apparatus may have a next highest priority following the address of the first electronic apparatus.

When sound is not received through the microphone 110 during a predetermined period of time after the third advertising packet including the sound output request and the address of the first electronic apparatus is transmitted, the processor 130 may transmit the third advertising packet including the address of the third electronic apparatus and the sound output request, through the communicator 120.

When the third electronic apparatus outputs sound, the processor 130 may control the communicator 120 to perform a pairing with the third electronic apparatus which outputs the sound.

However, when sound is not received during a predetermined period of time after the third advertising packet including the address of the third electronic apparatus is transmitted, given that an RSSI value of the second packet is the next largest following an RSSI value of the third packet, when the sound is not received during a predetermined time after the third advertising packet is transmitted, the processor 130 may transmit the third advertising packet including the sound output request and the address of the second electronic apparatus through the communicator 120.

The processor 130 may sequentially transmit the third advertising packet including the address of the electronic apparatus determined according to the priority based on whether or not sound is received.

For example, it is assumed that when a user tries to pair a remote controller with a TV in the living room, and a user is positioned closer to a TV in a room than the TV in the living room.

Since an advertising packet according to the Bluetooth communication method is an RF signal, the advertising packet can pass through a wall between a living room and a room.

Accordingly, both the TV in the living room and the TV in the room may receive an advertising packet transmitted by a remote controller and transmit an advertising packet including its own address as a response corresponding thereto.

Since a distance between the remote controller and the TV in the room is shorter than a distance between the remote controller and the TV in the living room, an RSSI value of an advertising packet received from the TV in the living room may be greater than an RSSI value of an advertising packet received from the TV in the room.

In this case, the remote controller may transmit an advertising packet including the address of the TV in the room and a sound output request according to the RSSI value.

The TV in the room may receive a packet transmitted from the remote controller, and output sound in response thereto, but the sound may be blocked by a wall between the living room and the room, and thus, the remote controller may not receive the sound output from the TV in the room.

In this case, when the sound is not received during a predetermined period of time after the advertising packet is transmitted, the remote controller may transmit the advertising packet including the address of the TV in the living room and a sound output request, and therefore, the remote controller may perform a pairing with the TV in the living room.

A pairing between devices may be performed in accordance with a user's intention by sequentially transmitting an advertising packet according to an RSSI value.

The processor 130 may sequentially transmit addresses received from a plurality of electronic apparatuses, but when sound is not received, the processor 130 may transmit the third advertising packet sequentially again according to the priority.

The processor 130 may sequentially transmit the third advertising packet according to the priority in the same manner described above.

The processor 130 may request an electronic apparatus to change a volume level of sound output from an electronic apparatus.

The third advertising packet may further include information regarding a volume level of an electronic apparatus, as well as information on the address of the electronic apparatus and the sound output request. The electronic apparatus may output sound according to a volume level included in the third advertising packet.

When sequentially transmitting again the third advertising packet according to the priority, the processor 130 may determine a volume level included in the third advertising packet to a level higher than the previous one, and transmit the third advertising packet.

A volume level may be determined again for the possibility that the electronic apparatus that receives the third advertising packet may output sound, but at a low volume level, so that the remote control apparatus 100 may not receive the sound output from the electronic apparatus.

As described above, the remote control apparatus 100 may specify a device for performing a pairing prior to paring, and then perform a pairing with the specified device.

Figure 3:
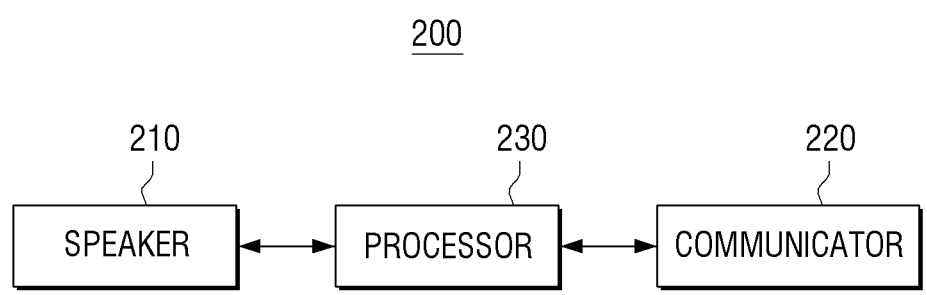
FIG. 3 is a block diagram illustrating an example configuration of an electronic apparatus according to an example embodiment of the present disclosure.

FIG. 3 is a block diagram illustrating an example configuration of an electronic apparatus according to an example embodiment of the present disclosure.

Referring to FIG. 3, an electronic apparatus 200 may include a speaker 210, a communicator (e.g., including communication circuitry) 220 and a processor (e.g., including processing circuitry) 230.

The speaker 210 may output sound. The speaker 210 may output non-audible sound (e.g., sound in a non-audible frequency band).

The sound in the non-audible frequency band may, for example, and without limitation, include sound in a frequency band (e.g., sound above 20 kHz) other than the audible frequency band that people can actually hear (e.g., 20 Hz to 20 kHz).

The communicator 220 may include various communication circuitry and perform communication with the remote control apparatus 100. The communicator 220 may, for example, and without limitation, perform communication with the remote control apparatus 100 according to the Bluetooth communication method. The Bluetooth communication method may include Bluetooth Low Energy (BLE).

The communicator 220 may perform a pairing with the remote control apparatus 100 according to the Bluetooth communication method, generate a communication link with the remote control apparatus 100, and perform communication with the remote control apparatus 100 through the communication link.

The communicator 220 may, for example, and without limitation, include a Bluetooth communication chip for performing communication according to the Bluetooth communication method.

The processor 230 may control the overall operation of the electronic apparatus 200.

When the first advertising packet is received from the remote control apparatus 100, the processor 230 may control the communicator 220 to transmit the second advertising packet including the address of the electronic apparatus 200.

The address may be a Bluetooth MAC address of the electronic apparatus 200.

When the third advertising packet including the address of the electronic apparatus and the sound output request, is received from the remote control apparatus 100 through the communicator 220 in response to the transmission of the second advertising packet, the processor 230 may output sound through the speaker 210 in response to reception of the third advertising packet.

The sound may, for example, and without limitation, include sound in a non-audible frequency band.

When the third advertising packet transmitted from the remote control apparatus 100 is received, the processor 230 may determine whether the address of the electronic apparatus included in the third advertising packet is the same as the address of the electronic apparatus 200.

When the address of the electronic apparatus included in the third advertising packet is the same as the address of the electronic apparatus 200, the processor 230 may output non-audible sound through the speaker 210 upon the sound output request included in the third advertising packet.

The processor 230 may determine a volume level of the sound output through the speaker 210 based on information with respect to the volume level included in the third advertising packet, and output non-audible sound through the speaker 210 according to the determined volume level.

When the fourth advising packet including a pairing request is received from the remote control apparatus 100 through the communicator 220 in response to the output of the sound, the processor 230 may control the communicator 220 to perform a pairing with the remote control apparatus 100.

When the electronic apparatus 200 receives sound output from the electronic apparatus 200, the remote control apparatus 100 may transmit the fourth advertising packet including the address of the electronic apparatus 200 and the pairing request.

When the fourth advertising packet is received through the communicator 220, the processor 230 may determine whether the address of the electronic apparatus included in the fourth advertising packet is the same as the address of the electronic apparatus 200, if that be so, control the communicator 220 to perform a pairing with the remote control apparatus 100.

The electronic apparatus 200 may be connected to the remote control apparatus 100 according to, for example, and without limitation, the Bluetooth communication method.

When the address of the electronic apparatus included in the third advertising packet is not the same as the address of the electronic apparatus 200, the processor 230 may not output sound through the speaker 210.

When the third advertising packet is received again, the processor 230 may determine whether the received address included in the third advertising packet is the same as the address of the electronic apparatus 200. Accordingly, the processor 230 may output sound or may not output sound.

Figure 4:
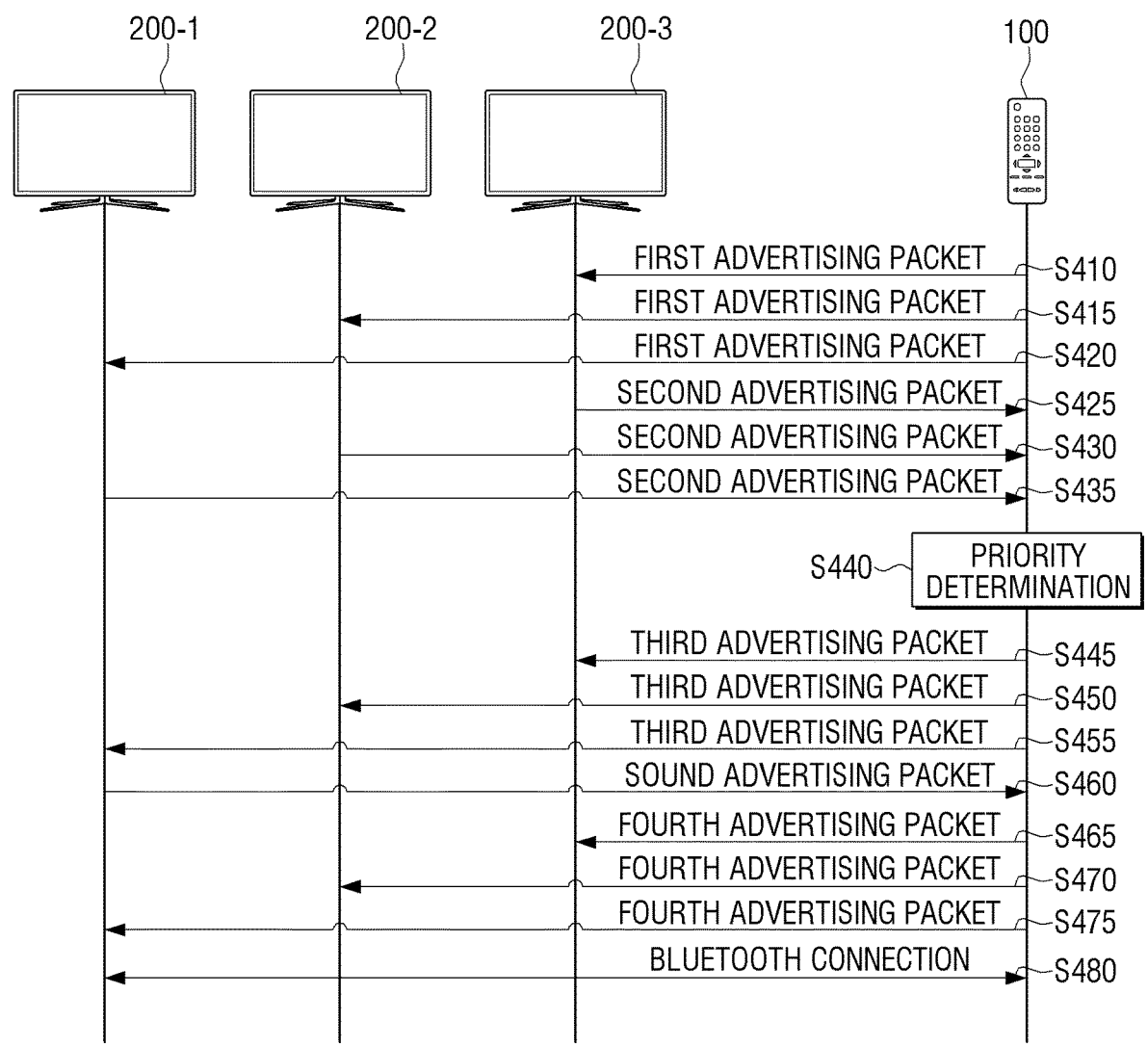
FIG. 4 is a diagram illustrating an example pairing method according to an example embodiment of the present disclosure.

FIG. 4 is a diagram illustrating an example pairing method according to an example embodiment of the present disclosure.

Referring to FIG. 4, it is assumed that three electronic apparatuses 200-1, 200-2 and 200-3 are provided at a periphery of the remote control apparatus 100.

The remote control apparatus 100 may transmit a first advertising packet at steps S410, S415 and S420.

The first electronic apparatus 200-1, the second electronic apparatus 200-2, and the third electronic apparatus 200-3 may receive a first advertising packet and transmit a second advertising packet including respective addresses of the electronic apparatuses in response thereto at steps S425, S430 and S435.

The remote control apparatus 100 may receive a second advertising packet transmitted from the first, second and third electronic apparatuses 200-1, 200-2 and 200-3, determine the RSSI value of the received packet, and determine a priority based on the RSSI value at step S440.

For example, it is assumed that an RSSI value of the first packet received from the first electronic apparatus 200-1 may be the greatest, an RSSI value of the third packet received from the third electronic apparatus 200-3 may be the second greatest, and an RSSI value of the second packet received from the second electronic apparatus 200-2 may be the third greatest.

The remote control apparatus 100 may determine a priority in the order of the address of the first electronic apparatus 200-1, the address of the third electronic apparatus 200-3, and the address of the second electronic apparatus 200-2.

The remote control apparatus 100 may transmit the third advertising packet including the address of the first electronic apparatus 200-1 having the highest priority and the sound output request at steps S445, S450 and S455.

The first electronic apparatus 200-1, the second electronic apparatus 200-2 and the third electronic apparatus 200-3 may receive the third advertising packet. The first electronic apparatus 200-1, the second electronic apparatus 200-2 and the third electronic apparatus 200-3 may determine whether the address included in the third advertising packet is the same as its own address, and if that be so, may output sound upon a sound output request included in the third advertising packet.

Since the third advertising packet includes the address of the first electronic apparatus 200-1, the first electronic apparatus 200-1 may output sound upon the sound output request at step S460. The sound could be sound in a non-audible frequency band.

The second electronic apparatus 200-2 and the third electronic apparatus 200-3 may not output sound since the address included in the third advertising packet is not the same as its own address.

The remote control apparatus 100 may receive sound output from the first electronic apparatus 200-1 and transmit a fourth advertising packet including a pairing request and the address of the first electronic apparatus 200-1 in response to reception of sound at steps S465, S470 and S475.

The first electronic apparatus 200-1, the second electronic apparatus 200-2 and the third electronic apparatus 200-3 may receive the fourth advertising packet.

The first electronic apparatus 200-1, the second electronic apparatus 200-2 and the third electronic apparatus 200-3 may determine whether the address included in the fourth advertising packet is the same as its own address, and if that be so, perform a pairing with the remote control apparatus upon a pairing request.

Since the fourth advertising packet includes the address of the first electronic apparatus 200-1, the first electronic apparatus 200-1 may perform a Bluetooth communication connection operation such as performing a pairing with the remote control apparatus 100 upon a pairing request at step S480.

Figure 5:
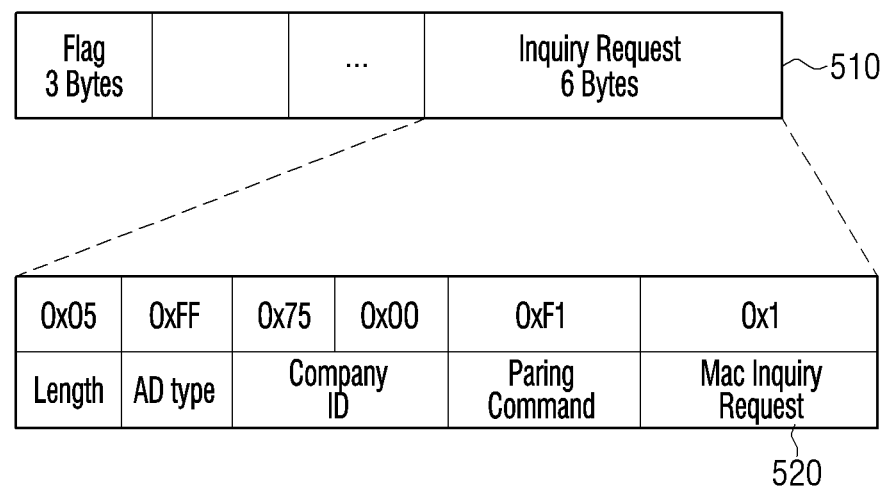
FIGS. 5, 6 and 7 are diagrams illustrating example structures of an advertising packet according to an example embodiment of the present disclosure.
Figure 6:
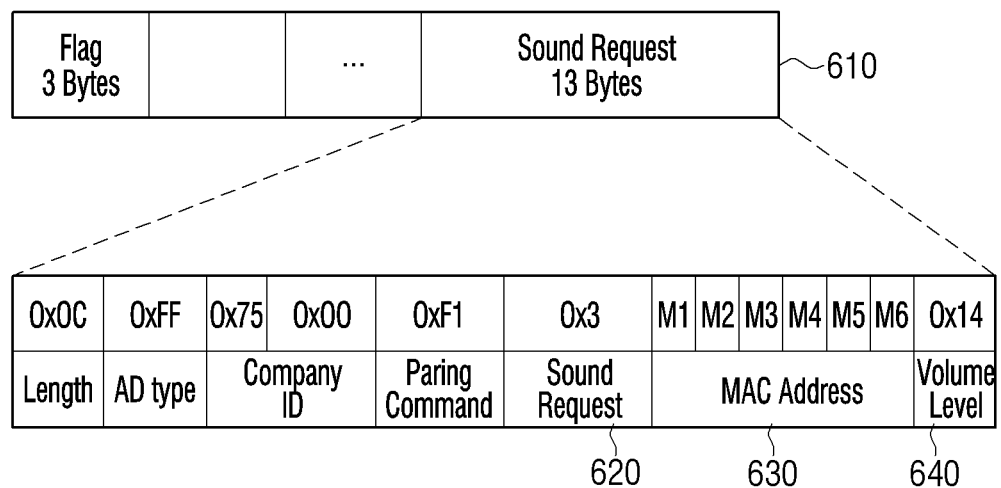
Figure 7:
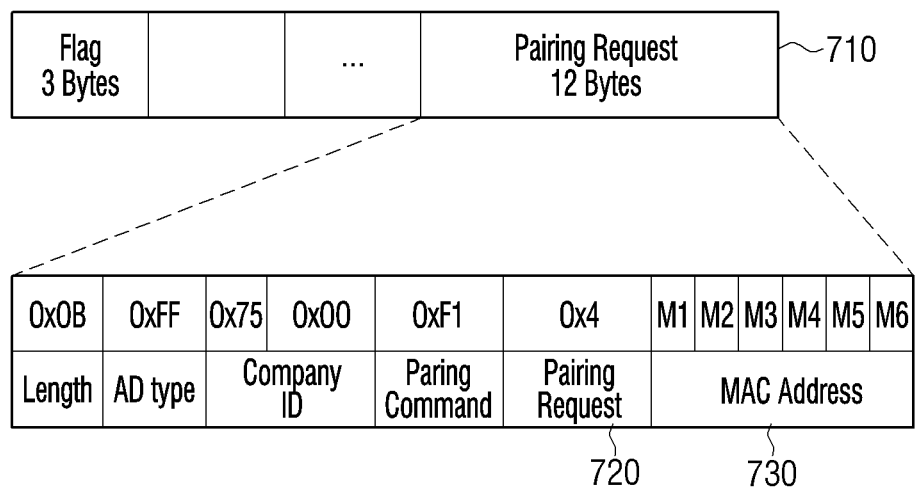

FIGS. 5, 6 and 7 are diagrams illustrating example structures of an advertising packet according to an example embodiment of the present disclosure.

FIG. 5 is a diagram illustrating an example structure of a first advertising packet. As illustrated in FIG. 5, information for requesting an address 520 may be included in a first advertising packet 510.

When the first advertising packet is received, the electronic apparatus 200 may transmit the second advertising packet including the address thereof upon the address request included in the first advertising packet.

FIG. 6 is a diagram illustrating an example structure of a third advertising packet, and, as illustrated in FIG. 6, information for a sound output request 620, an address of the electronic apparatus 630 and information on a volume level 640 may be included in a third advertising packet 610.

When the third advertising packet is received, the electronic apparatus 200 may determine whether the address included in the third advertising packet is the same as its own address. The electronic apparatus 200 may, when the address included in the third advertising packet is the same as its own address, output non-audible sound upon a sound output request. The electronic apparatus 200 may set a volume level based on information on a volume level included in the third advertising packet, and output non-audible sound at a predetermined volume level.

FIG. 7 is a diagram illustrating an example structure of the fourth advertising packet, and, as illustrated in FIG. 7, information for a pairing request 720 and an address of an electronic apparatus 730 may be included in a fourth advertising packet 710.

When the fourth advertising packet is received, the electronic apparatus 200 may determine whether the address included in the fourth advertising packet is the same as its own address. The electronic apparatus 200 may, when the address included in the fourth advertising packet is the same as its own address, may perform a pairing with the remote control apparatus 200 upon a pairing request.

Figure 8:
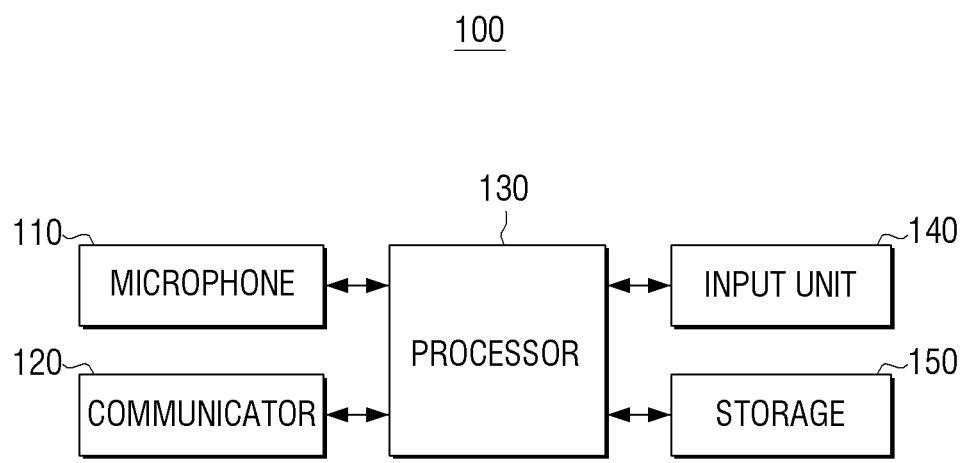
FIG. 8 is a block diagram illustrating an example configuration of a remote control apparatus according to an example embodiment of the present disclosure.

FIG. 8 is a block diagram illustrating an example configuration of a remote control apparatus according to an example embodiment of the present disclosure.

Referring to FIG. 8, a remote control apparatus 100 may include a microphone 110, a communicator (e.g., including communication circuitry) 120, a processor (e.g., including processing circuitry) 130, an input unit (e.g., including input circuitry) 140 and a storage 150 (e.g., a memory). An operation of an element may be controlled by the processor 130. However, the configuration illustrated in FIG. 8 is merely an example, and according to an embodiment example, a new configuration may be further included, or at least one element may be removed.

The microphone 110, the communicator 120 and the processor 130 illustrated in FIG. 8 are described in detail in FIG. 2. Thus, the detailed description thereof will not be repeated here.

The processor 130 may, for example, include various processing circuitry and control hardware or software elements connected to the processor 130 by driving an operation system or an operation program, and perform various data processing and calculation. The processor 130 may load commands or data received from at least one of other elements to a volatile memory and process the commands or data, and store various data in a non-volatile memory.

The processor 130 may execute a process for performing an operation (e.g., an embedded processor) or one or more software programs stored in a memory device, so that it could be embodied as a generic-purpose processor for performing the operations (e.g., a CPU or an application processor).

The input unit 140 may include various input circuitry and receive various user commands. For example, the input unit 140 may receive a user command for controlling the electronic apparatus 200 (e.g., a power on/off, channel control or volume control) and may, for example, and without limitation, include a button (not shown) and/or a touch pad (not shown), or the like.

The processor 130 may perform a function corresponding to a user command input by the input unit 140.

When a user command for entering a pairing mode is input, the processor 130 may perform the above-described operation and control the communicator 120 to perform communication connection with the electronic apparatus 200.

When a user command for controlling the electronic apparatus 200 is received, the processor 130 may control the communicator 120 to transmit a control command for controlling the electronic apparatus 200 to the electronic apparatus 200.

The storage 150 may store commands or data received from the processor 130 or other elements (e.g., a microphone 110, a communicator 120, an input unit 140, etc.) or generated by the processor 130 or the other elements.

The storage 150 may include programming modules, for example, Kernel, middleware, application programming interface (API) or application. The above described programming modules may be configured with software, firmware, hardware, or a combination of at least two of them.

The storage 150 may store information corresponding to the remote control apparatus 100. The information may include a model name, a unique ID (device ID), a memory level, the presence of object data, a Bluetooth version, or a Bluetooth profile.

Figure 9:
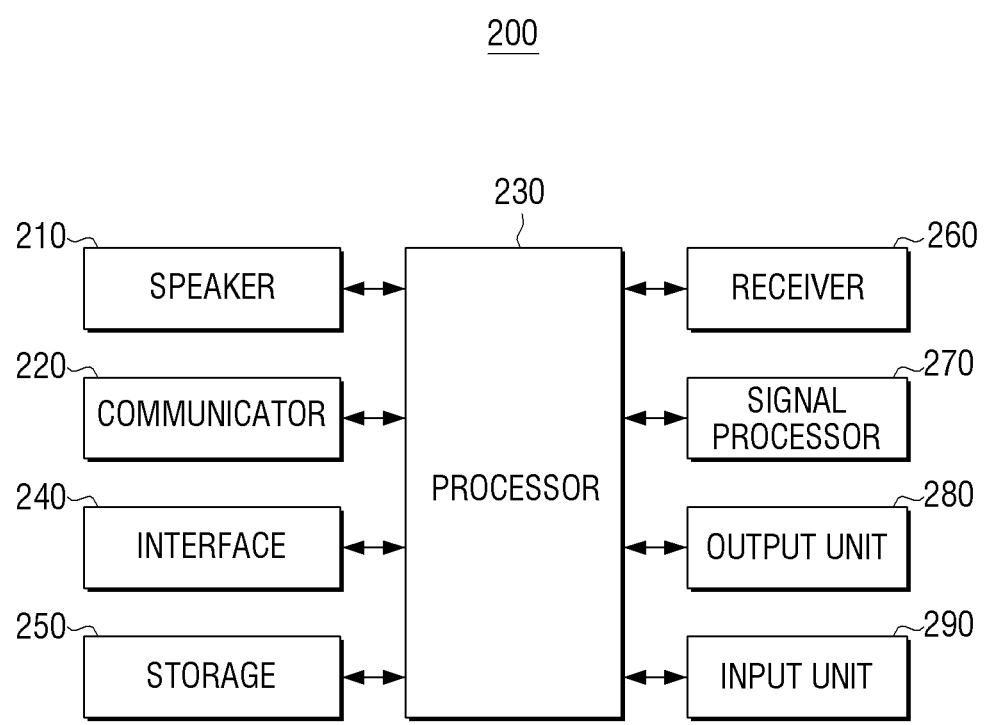
FIG. 9 is a block diagram illustrating an example configuration of an electronic apparatus according to an example embodiment of the present disclosure.

FIG. 9 is a block diagram illustrating an example configuration of an electronic apparatus according to an example embodiment of the present disclosure.

Referring to FIG. 9, an electronic apparatus 200 may include a speaker 210, a communicator (e.g., including communication circuitry) 220, a processor (e.g., including processing circuitry) 230, an interface (e.g., including interface circuitry) 240, a storage 250, a receiver (e.g., including receiving circuitry) 260, a signal processor (e.g., including signal processing circuitry) 270, an output unit (e.g., including output circuitry) 280 and an input unit (e.g., including input circuitry) 290. The operations of these elements may be controlled by the processor 230. The configuration illustrated in FIG. 9 is merely an example, but a new element may be further added, or at least one element may be eliminated depending on an example embodiment.

Since the speaker 210, the communicator 220 and the processor 230 of FIG. 9 have been described in detail in FIG. 3, the detailed description will not be repeated here.

The processor 230 may, for example, include various processing circuitry and control hardware and/or software elements connected to the processor 230 by driving an operation system and an application program and perform various data processing and calculation. The processor 230 may load and process commands or data received from at least one of other elements to a non-volatile memory, and store various data in a non-volatile memory.

The processor 130 may execute a processor only for performing an operation (e.g., an embedded processor) or one or more software programs stored in a memory device, so that it could be embodied as a generic-purpose processor for performing the operations (e.g., a CPU or an application processor).

The processor 230 may control the electronic apparatus 200 according to a control command transmitted from the remote control apparatus 100.

For example, when a control command for controlling the electronic apparatus 200 is received through the communicator 220, the processor 230 may perform various functions, such as channel change or volume control according to the received control command.

The interface 240 may be connected to various types of electronic apparatuses. The interface 220 may include various interface circuitry including various types of ports and may be connected to electronic devices such as, for example, and without limitation, a set-top box and/or an audio device, or the like, via, for example, and without limitation, an optical cable, an RCA cable, and/or an AUX cable, or the like.

The storage 250 may store commands or data received from the processor 230 or other elements (e.g., the speaker 210, the communicator 220, the processor 230, the interface 240, the storage 250, the receiver 260, the signal processor 270, the output unit 280 and the input unit 290) or generated by the processor 230 or other elements.

The storage 150 may include programming modules, for example, Kernel, middleware, application programming interface (API) or application. The above described programming modules may be configured with software, firmware, hardware, or any combinations thereof.

The storage 150 may store information corresponding to the remote control apparatus 100. The information may include a model name, a unique ID (device ID), a memory level, the presence of object data, a Bluetooth version, or a Bluetooth profile.

The receiver 260 may include various receiving circuitry and receive a broadcast content (or a broadcast signal). The broadcast content may include video signals and audio signals, and the receiver 260 may receive broadcast contents from various sources such as terrestrial broadcast, cable broadcast, satellite broadcast, Internet broadcast, and the like.

For example, the receiver 260 may include various receiving circuitry, such as, for example, and without limitation, a tuner (not shown), a demodulator (not shown), an equalizer (not shown), or the like, in order to receive a broadcast content transmitted from a broadcasting station.

The signal processor 270 may include various signal processing circuitry and perform signal processing with respect to the content received through the receiver 260 or the interface 240. The signal processor 270 may perform operations with respect to image signals of the content such as decoding, scaling and frame rate conversion, and process the signals to be output from a display (not shown) of the output unit 280. The signal processor 260 may perform signal processing with respect to audio signals of the content such as decoding, etc. and process the signals to be output from an audio output unit (not shown) of the output unit 280.

The output unit 280 may include various output circuitry including, for example, and without limitation, a display (not shown) for displaying an image signal output from the signal processor 20 and/or an audio output unit (not shown) for outputting an audio signal output from the signal processor 270, or the like.

In this case, the display (not shown) may be implemented, for example, and without limitation, by a liquid crystal display (LCD), an OLED (Organic Light Emitting Diodes) display or the like, and an audio output unit (not shown) may be embodied as a speaker (not shown) or an external output terminal (not shown).

The input unit 290 may include various input circuitry and receive various user commands. For example, the input unit 280 may receive a user command for performing channel change, volume control, audio output conversion, etc., and the processor 230 may change a channel or control a volume according to the input user command.

The input unit 290 may be embodied with an input panel. The input panel may be embodied with various input circuitry, such as, for example, and without limitation, a touch pad, a key pad including various function keys, numeric keys, special keys, and character keys, and/or a touch pad, or the like.

Figure 10:
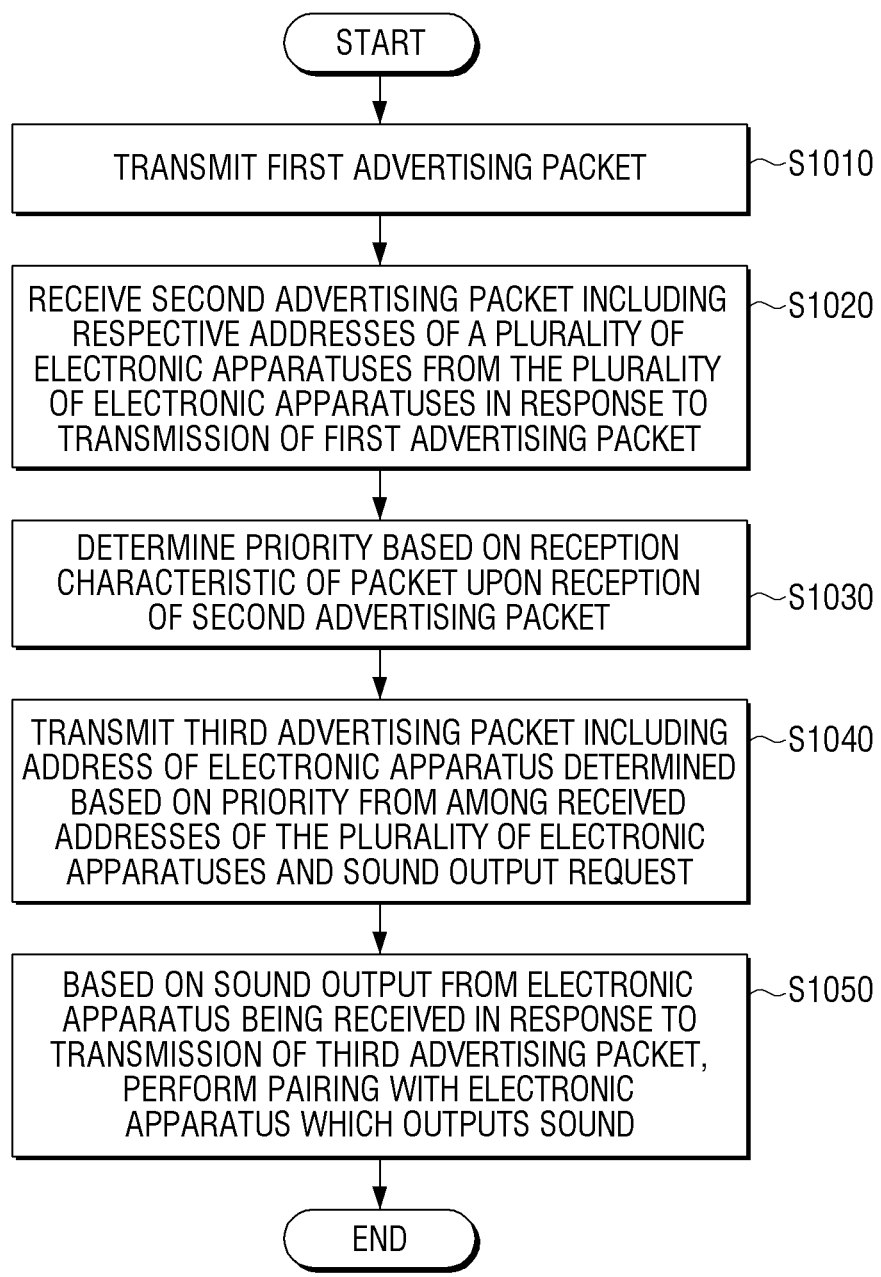
FIG. 10 is a flowchart illustrating an example pairing method of a remote control apparatus according to an example embodiment of the present disclosure.

FIG. 10 is a flowchart illustrating an example pairing method of a remote control apparatus according to an example embodiment of the present disclosure.

A first advertising packet may be transmitted at step S1010.

A second advertising packet including respective addresses of a plurality of electronic apparatuses may be received from the plurality of electronic apparatuses in response to the transmission of the first advertising packet at step S1020. The address of the electronic apparatus may include a Bluetooth MAC address of the electronic apparatus.

When the second advertising packet is received, a priority may be determined based on the reception characteristic of the packet at step S1030. The reception characteristic of the packet may include a received signal strength indicator (RSSI) of the packet.

At step S1030, a priority may be determined so that an address of an electronic apparatus transmitted through a packet having a relatively large RSSI value has a relatively high priority.

A third advertising packet including a sound output request and an address of an electronic apparatus determined based on a priority from among the addresses of the plurality of addresses may be transmitted at step S1040.

When the sound output from the electronic apparatus is received in response to the transmission of the third advertising packet, a pairing with an electronic apparatus that outputs sound may be performed at step S1050. The sound may include sound in a non-audible frequency band.

At step S1050, a fourth advertising packet including a pairing request and an address of an electronic apparatus which outputs sound may be transmitted to an electronic apparatus which outputs sound, and a pairing with the electronic apparatus which outputs sound may be performed in response to the transmission of the fourth advertising packet.

At step S1040, when sound is not received after the third advertising packet is transmitted, the third advertising packet including a sound output request and an address of the electronic apparatus having a next highest priority following the address of the electronic apparatus, which is transmitted based on the priority may be transmitted.

Figure 11:
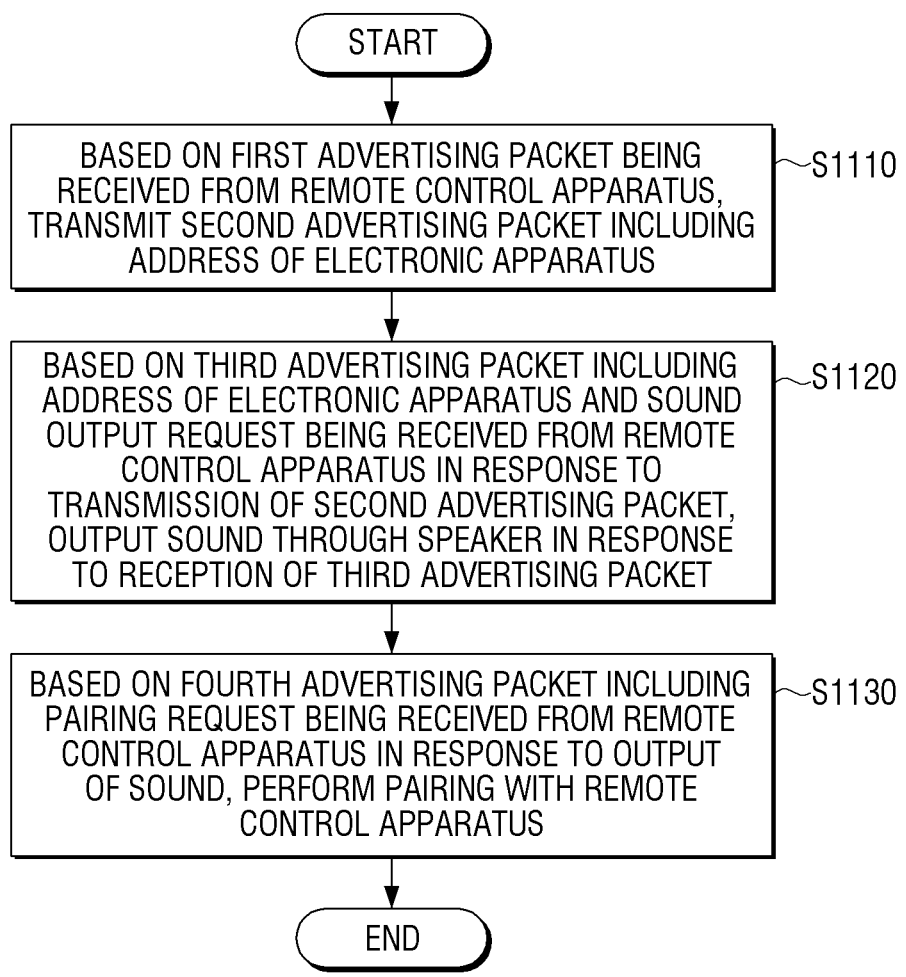
FIG. 11 is a flowchart illustrating an example pairing method of an electronic apparatus according to an example embodiment of the present disclosure.

FIG. 11 is a flowchart illustrating an example pairing method of an electronic apparatus according to an example embodiment of the present disclosure.

When a first advertising packet is received from a remote control apparatus, a second advertising packet including the address of the electronic apparatus may be transmitted at step S1110.

The address of the electronic apparatus may include a Bluetooth MAC address of the electronic apparatus.

When a third advertising packet including the address of the electronic apparatus and a sound output request is received from the remote control apparatus in response to the transmission of the second advertising packet, sound may be output through a speaker in response to reception of the third advertising packet at step S1120.

The sound may include the sound in a non-audible frequency band.

When the fourth advertising packet including a pairing request is received from a remote control apparatus in response to the transmission of the sound, a pairing may be performed with the remote control apparatus at step S1130.

As described above, according to various example embodiments, communication errors due to interference and collision that could occur as a plurality of electronic apparatuses simultaneously output sound could be prevented and/or reduced in that an electronic apparatus outputs sound according to an address of an electronic apparatus included in an advertising packet, reliability with regard to pairing could be ensured and/or improved even in the presence of a plurality of electronic devices in that a device for performing a pairing could be specified according to a priority. In addition, cost reduction could be available in that a pairing could be performed with a specified device without using an additional communication such as OFDM. Further, a remote control apparatus could perform a pairing operation with a specified electronic apparatus in that a unicast communication scheme is embodied by adding specific data such as address to an advising packet (i.e. Undirected Advertising Packet) used in a multicast communication method and transmitting them, and the electronic apparatus which receives the packet performs a specific operation.

Various example embodiments of the present disclosure may be embodied as software including commands stored in machine-readable storage media. The machine may be an apparatus that calls a command stored in a storage medium and is operable according to the called command, including an electronic device in accordance with the disclosed example embodiments (e.g., an electronic device 100). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may include a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although various example embodiments have been illustrated and described, it will be appreciated by those skilled in the art that changes may be made to these example embodiments without departing from the principles and spirit of the present disclosure. Accordingly, the scope of the present disclosure is not to be understood as being limited to the described example embodiments, but is defined, for example, and without limitation, by the appended claims as well as equivalents thereto.

What is claimed is:

1. A remote control apparatus, comprising:
a microphone;
a communicator comprising communication circuitry configured to transmit a first advertising packet, and to receive a second advertising packet including respective addresses of a plurality of electronic apparatuses from the plurality of electronic apparatuses in response to the first advertising packet being transmitted from the remote apparatus; and
a processor configured to:
in response to the second advertising packet being received, identify a priority of the addresses of the plurality of electronic apparatuses based on a reception characteristic of the second advertising packet,
control the communicator to transmit a third advertising packet including a sound output request and an address of a first electronic apparatus identified based on the priority from among the addresses of the plurality of electronic apparatuses,
in response to the third advertising packet being transmitted from the remote control apparatus, control the communicator to perform a pairing with the first electronic apparatus based on a sound output from the first electronic apparatus being received through the microphone; and
in response to the third advertising packet being transmitted from the remote control apparatus, control the communicator to transmit a third advertising packet including a sound output request and an address of a second electronic apparatus identified as being next to the address of the first electronic apparatus based on the priority, based on the sound output from the first electronic apparatus not being received through the microphone.

2. The remote control apparatus as claimed in claim 1, wherein the reception characteristic of the second packet includes a received signal strength indicator (RSSI) of the packet.

3. The remote control apparatus as claimed in claim 2, wherein the processor is further configured to identify the priority where an address of an electronic apparatus transmitted through a packet having a relatively large RSSI has a relatively high priority.

4. The remote control apparatus as claimed in claim 1, wherein the processor is further configured to transmit a fourth advertising packet including a pairing request and an address of the electronic apparatus based on the sound output from the first electronic apparatus being received through the microphone, and to control the communicator to perform a pairing with the first electronic apparatus which outputs the sound in response to the fourth advertising packet being transmitted.

5. The remote control apparatus as claimed in claim 1, wherein an address of the first electronic apparatus includes a Bluetooth MAC address of the first electronic apparatus.

6. The remote control apparatus as claimed in claim 1, wherein the sound includes a sound in a non-audible frequency band.

7. A pairing method of a remote control apparatus, the method comprising:
transmitting a first advertising packet;
receiving a second advertising packet including respective addresses of a plurality of electronic apparatuses from the plurality of electronic apparatuses in response to the first advertising packet being transmitted from the remote control apparatus; and identifying a priority based on reception characteristic of the second advertising packet upon receiving the second advertising packet;

transmitting a third advertising packet including a sound output request and an address of a first electronic apparatus identified based on the priority from among the received addresses of the plurality of electronic apparatuses;

based on a sound output from the first electronic apparatus being received in response to the third advertising packet being transmitted from the remote control apparatus, performing a pairing with the first electronic apparatus which outputs the sound; and based on the sound output from the first electronic apparatus not being received in response to the third advertising packet being transmitted from the remote control apparatus, transmitting a third advertising packet including a sound output request and an address of a second electronic apparatus identified as being next to the address of the first electronic apparatus based on the priority.

8. The method as claimed in claim 7, wherein the reception characteristic of the packet includes a received signal strength indicator (RSSI) of the packet.

9. The electronic apparatus as claimed in claim 8, wherein the identifying comprises identifying the priority where an address of an electronic apparatus transmitted through a packet having a relatively large RSSI has a relatively high priority.

10. The method as claimed in claim 7, wherein the pairing comprises, transmitting a fourth advertising packet including a pairing request and an address of the first electronic apparatus based on the sound being received from the first electronic apparatus, and performing a pairing with the first electronic apparatus which outputs the sound in response to the fourth advertising packet being transmitted from the remote control apparatus.

11. The method as claimed in claim 7, wherein an address of the first electronic apparatus includes a Bluetooth MAC address of the first electronic apparatus.

12. The method as claimed in claim 7, wherein the sound includes sound in a non-audible frequency band.

* * * * *